United States Patent
Chang

(10) Patent No.: US 10,704,175 B2
(45) Date of Patent: Jul. 7, 2020

(54) RECOVERY CONTAINER AND DYE CHEMICAL SAVING STRUCTURE OF CONVEYOR-DRIVEN FABRIC DYEING MACHINE

(71) Applicant: Chi-Lung Chang, Taoyuan (TW)

(72) Inventor: Chi-Lung Chang, Taoyuan (TW)

( * ) Notice: Subject to any disclaimer, the term of this patent is extended or adjusted under 35 U.S.C. 154(b) by 177 days.

(21) Appl. No.: 15/905,837

(22) Filed: Feb. 27, 2018

(65) Prior Publication Data
US 2019/0032261 A1 Jan. 31, 2019

(30) Foreign Application Priority Data

Jul. 25, 2017 (TW) .............................. 106210903 A

(51) Int. Cl.
| | |
|---|---|
| *D06B 3/22* | (2006.01) |
| *D06B 23/20* | (2006.01) |
| *D06B 23/22* | (2006.01) |
| *D06B 23/14* | (2006.01) |
| *D06B 23/16* | (2006.01) |
| *D06B 3/28* | (2006.01) |

(52) U.S. Cl.
CPC ............... *D06B 3/22* (2013.01); *D06B 23/14* (2013.01); *D06B 23/16* (2013.01); *D06B 23/20* (2013.01); *D06B 23/22* (2013.01); *D06B 3/28* (2013.01); *D06B 2700/36* (2013.01)

(58) Field of Classification Search
None
See application file for complete search history.

(56) References Cited

U.S. PATENT DOCUMENTS

| 3,802,840 | A | * | 4/1974 | Chiba | .................... | D06B 3/28 8/152 |
| 2002/0174694 | A1 | * | 11/2002 | Bozzo | .................... | D06B 3/28 68/177 |
| 2008/0263782 | A1 | * | 10/2008 | Christ | .................... | D06B 3/28 8/149.1 |
| 2009/0013479 | A1 | * | 1/2009 | Shimizu | .................... | D06B 3/28 8/159 |
| 2015/0337472 | A1 | * | 11/2015 | Chang | .................... | D06B 3/36 68/12.07 |
| 2016/0215427 | A1 | * | 7/2016 | Schmitz | .................... | D06B 3/28 |

* cited by examiner

*Primary Examiner* — Cristi J Tate-Sims
(74) *Attorney, Agent, or Firm* — Leong C. Lei

(57) ABSTRACT

A conveyor-driven fabric dyeing machine includes a recovery container and a dye chemical saving structure. One or multiple containers are provided for recovering and storing hot water for use in a next dyeing operation in order to achieve an effect of saving energy and shortening dyeing time. If desired, liquids for dyeing may be directly collected and recovered, such as water with low contamination or alkali liquid for specific treatment, for use in a next dyeing operation in order to achieve an effect of saving water and reducing the amount of chemicals consumed, and also to reduce the amount of dye and chemicals that is consumed due to oxidation and reduction caused by air. The recovery container may be provided therein with a heat exchanger for recovery of heat. A gas filling opening is formed in the machine body for introducing a gas to expel out air.

5 Claims, 1 Drawing Sheet

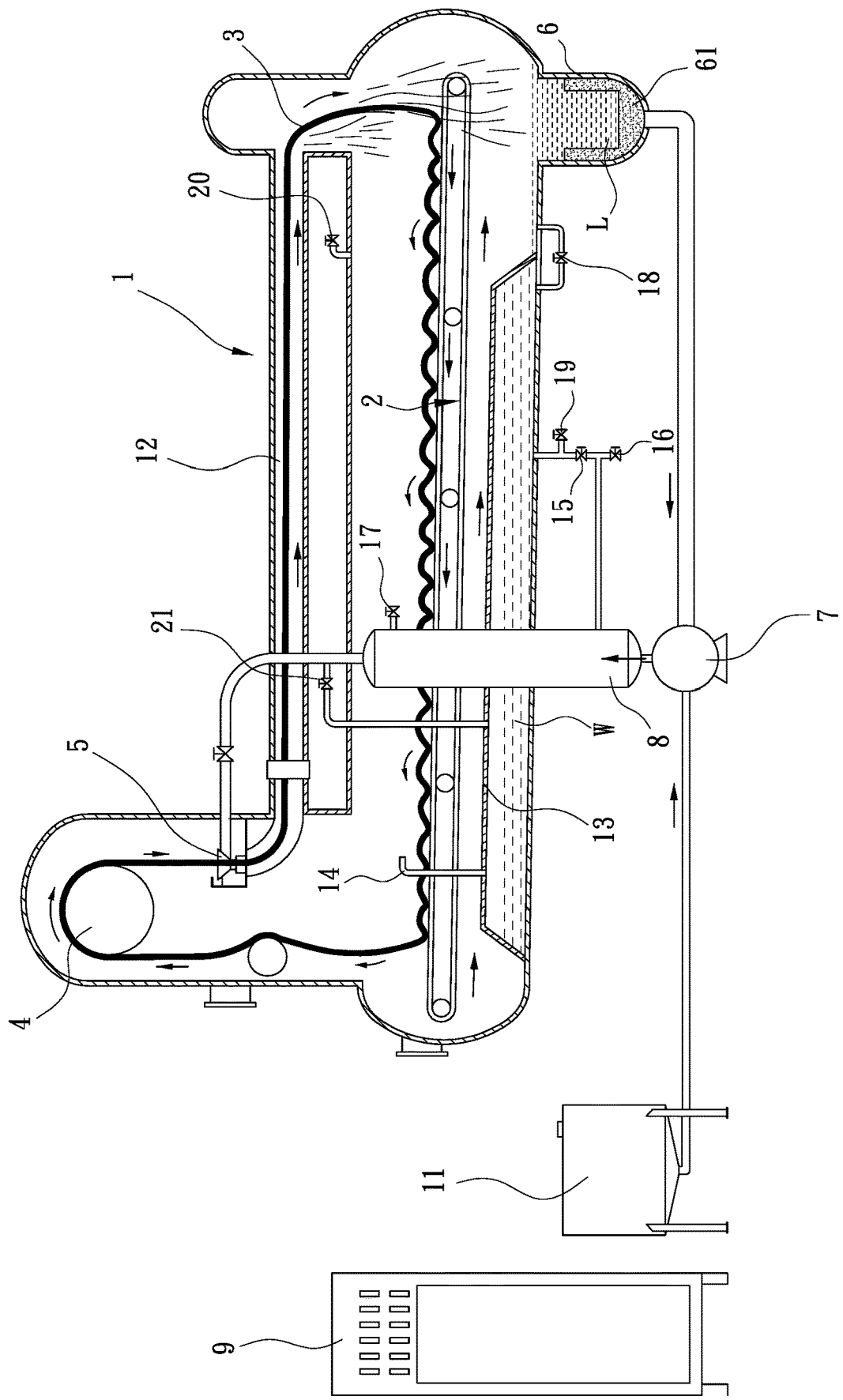

RECOVERY CONTAINER AND DYE CHEMICAL SAVING STRUCTURE OF CONVEYOR-DRIVEN FABRIC DYEING MACHINE

TECHNICAL FIELD OF THE INVENTION

The present invention relates to a dyeing machine for conducting a dyeing operation of fabric, and in particular to a structure that makes use of an internal space of a machine body of a dyeing machine to form a recovery container and to greatly reduce the internal space of the entire dyeing machine.

DESCRIPTION OF THE PRIOR ART

In a dyeing process, certain operations might be conducted with hot water. Meanwhile, hot water may be generated in an operation for lowering temperature in the dyeing process. To save the amount of water used and also to shorten the dyeing time, a conventional dyeing machine is often included with a hot water recovery barrel or a pre-heating barrel that is installed outside a machine body of the dyeing machine. Such a way of installation of the hot water recovery barrel or the pre-heating barrel suffer drawbacks of waste of space and cost.

Due to the installation of the pre-heating barrel outside the machine body, the conventional dyeing machine is quite bulky in size and would occupy an increased amount of space of a workshop, making it uneconomic.

SUMMARY OF THE INVENTION

The primary objective of the present invention is to provide a structure that makes better use of an interior space of a machine body of a dyeing machine for installation of a structure of a recovery container and for reduction of an overall size of the dyeing machine and also for use of hot water collected in a cooling process or recovery of dye liquid having low contamination or a solution, such as alkali liquid, for specific treatment in a next dyeing operation so as to save the expenditure for constructing a pre-heating barrel that is conventionally used, shortening the time of dyeing, and saving the mount of dye and chemicals used.

Another objective of the present invention is to provide a gas filling opening mounted to a predetermined location on a machine body of a dyeing machine to introduce a gas therein in order to expel out air contained in the machine body and to delay or prevent, by means of the characteristics of the gas, oxidation and reduction of dye and chemicals caused by air and evaporation thereof. The technical solution of the present invention comprises one or multiple recovery containers mounted in an interior space of a machine body of a dyeing machine at a predetermined location for storage of hot water generated during a cooling operation of a dyeing process or dye liquid having low contamination for use in a subsequent dyeing process. Another technical solution of the present invention comprises a gas filling opening mounted to a machine body of a dyeing machine at a predetermined location for introduction of a gas therein in order to alleviate or prevent oxidation and reduction of dye and chemicals caused by air.

Preferably, the present invention is structured such that the recovery container is fixed to a bottom, a top, or other suitable location of an interior space of the machine body.

By arranging the recovery container in the interior space of the machine body at a location that is below or above the conveyor device, it is possible to make full use of the interior space of the machine body without affecting the movement of fabric. This prevents installation of a recovery container at a location above and outside a dyeing machine and may save the amount of space occupied thereby and also reduce the total amount of the interior space of the machine body, namely reducing the amount of air filled therein, so as to save a portion of dye and chemicals consumed. Further, a gas filling opening is arranged on the machine body of the dyeing machine at a predetermined location for introduction of gas therein to expel out air contained in the machine body and to alleviate or prevent, through characteristic of the gas, oxidation and reduction of dye and chemicals caused by air and evaporation thereof so as to reduce the consumption of dye and chemicals.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 1 is a schematic view showing a structure of a dyeing machine according to the present invention that is provided with a recovery container and a gas filling opening.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

As shown in FIG. 1, the present invention provides a structure of a recovery container of a conveyor-driven fabric dyeing machine. The dyeing machine comprises a machine body 1 that is provided on an upper part thereof with a first dyeing tube 15 that is arranged in a horizontal or slightly inclined condition to receive fabric 3 to pass therethrough. The machine body 1 is provided, at a front end thereof, with a nozzle 5 and a fabric guide roller 4 that are located at an even higher location. A conveyor device 2 is arranged below the dyeing tube. The machine body is provided, at a rear end thereof, with a liquid storage tank 6. The liquid storage tank 6 has a bottom that is connected through a pipe to the nozzle 5. The pipe is provided with a pump 7 and a heat exchanger 8 mounted thereto. The pump 7 is further connected through a pipe to a chemicals barrel 11. Preferably, the liquid storage tank 6 is provided a filter 61 arranged therein. A recovery container 13 is arranged in an interior space of the machine body 1 at a location below the conveyor device 2. The recovery container 13 is structured such that welding is used to form joint thereof with a bottom surface of the interior space of the machine body 1 to form a unitary recovery container 13. The recovery container 13 may receive water for cooling the heat exchanger 8 through a cooling water outlet valve 15 into the recovery container 13, or may receive cold water supplied from outside the machine body through an inlet valve 19 to fill therein or may receive dye liquid having low contamination or alkali liquid for specific treatment from the machine body 1 through a dye liquid recovery valve 21 into the recovery container, and may discharge dye liquid L contained in the recovery container 13 through a connection valve 18 into the machine body 1 as a supply of hot water or recovered liquid in a dyeing process. The recovery container 13 may be detachably mounted inside the machine body 1. The recovery container 13 may be additionally provided with a heat exchanger 8 arranged therein in order to supply hot water of a predetermined temperature. The recovery container 13 may be structured such that depending on the condition of the interior space of the machine body 1, one or multiple recovery containers 13 are installed. The recovery container 13 and the machine body 1 are provided therebetween with a connection valve 18 to provide connection and communication between the recovery container 13 and the interior space of the machine body 1.

The dyeing machine may be operated for high-temperature dyeing or low-temperature dyeing. For high-temperature dyeing, a high pressure is induced in the interior of the machine body 1 and this may cause damage to the recovery container 13. Thus, it is desired that the recovery container 13 is provided with a connection tube 14 at a proper location thereof and higher than liquid level of the machine body 1 in order to achieve pressure balance between the machine body 1 and the recovery container and keep the recovery container 13 in a non-pressurized condition. When the machine body 1 is cooled down, cooling water flows through a cooling water inlet valve 17 of the heat exchanger 8 to get into the heat exchanger 8, undergoing heat exchange to generate hot water W that is supplied through cooling water outlet valve 15 to fill into and stored in the recovery container 13 and may be heated if necessary. When hot water is required for the dyeing process, the hot water stored in the recovery container 13 is supplied through the connection valve 18 into the machine body 1 as a direct supply of hot water W. This would save the time necessary for filling cold water and then causing a temperature rise thereof and may reuse the hot water W recovered from the heat exchanger 8 to achieve an effect of saving energy. If desired, cold and hot water may be directly introduced through an inlet valve 19 into the recovery container 13, or dye liquid L contained in the machine body 1 can be supplied through the pump 7 and the dye liquid recovery valve 21 into the recovery container 13 for storage for a next operation of dyeing. A gas filling opening 20 may be mounted to the machine body 1 at a predetermined location for introducing gas therein for expelling out air contained in the machine body such that through filling of the gas, oxidation/reduction and evaporation of the dye chemicals may be postponed or eliminated through the characteristics of the filled gas thereby reducing the amount of the dye and chemicals consumed and making the dyeing operation stable and enhancing the result of dyeing.

Cotton or fiber chips or debris generated during the conveyance and dyeing of the fabric 3 can be removed through impurity filtration conducted with the filter 61 at the time when the dye liquid L is drawn out of the liquid storage tank 6.

The heat exchanger 8 may be directly installed in the liquid storage tank 6 to increase efficiency of heat exchange and to further save the amount of water/liquid (liquor ratio) consumed in the dyeing operation.

In brief, the present invention provides a recovery container 13 arranged in an interior space of the machine body 1 at a location under the conveyor device 2 or any suitable location so that the interior space of the machine body can be fully used without affecting the movement of the fabric so that it is possible to avoid installation of a pre-heating barrel at a high location outside a dyeing machine thereby reducing the space occupied thereby and also reducing the loss of dye and chemicals due to oxidation caused by air and influence of dyeing result affected thereby.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A conveyor-driven fabric dyeing machine, which comprises a recovery container and a dye chemicals saving structure, the dyeing machine having a machine body that comprises an interior space in which a conveyor device is mounted,
    wherein at least one recovery container is installed in an interior space of the machine body at a location below the conveyor device, the recovery container being connected with a heat exchanger, the recovery container storing therein water discharged from the heat exchanger for a cooling operation, cold or hot water supplied from an external source, dye liquid having low contamination, alkali liquid, and other recyclable and reusable liquid generated in a dyeing operation for being subsequently and directly supplied for use by the dyeing machine, the machine body comprising a gas filling opening through which gas is filled into the machine body in order to delay or prevent oxidation and reduction of the dye and chemicals with air and evaporation of the dye and chemicals,
    wherein a liquid storage tank is mounted to the machine body to receive and hold therein a dye liquid, and the recovery container is separate from the liquid storage tank to selectively receive and hold water discharged from the heat exchanger.

2. The conveyor-driven fabric dyeing machine according to claim 1, wherein the recovery container comprises a heat exchanger mounted in an interior thereof in order to pre-heat water contained in the recovery container to a predetermined temperature.

3. The conveyor-driven fabric dyeing machine according to claim 1, wherein the recovery container is fixedly mounted in the interior of the machine body in such a way that a part of the recovery container is formed with a portion of the machine body.

4. The conveyor-driven fabric dyeing machine according to claim 1, wherein the recovery container is a stand-alone structure that is detachably mounted in the interior of the machine body.

5. The conveyor-driven fabric dyeing machine according to claim 1, wherein the recovery container and the gas filling opening are both installed or are separately installed.

* * * * *